July 29, 1930.  G. B. MUSTIN  1,771,506
METHOD OF MAKING CHEWING GUM SANDWICHES
Filed Nov. 10, 1926
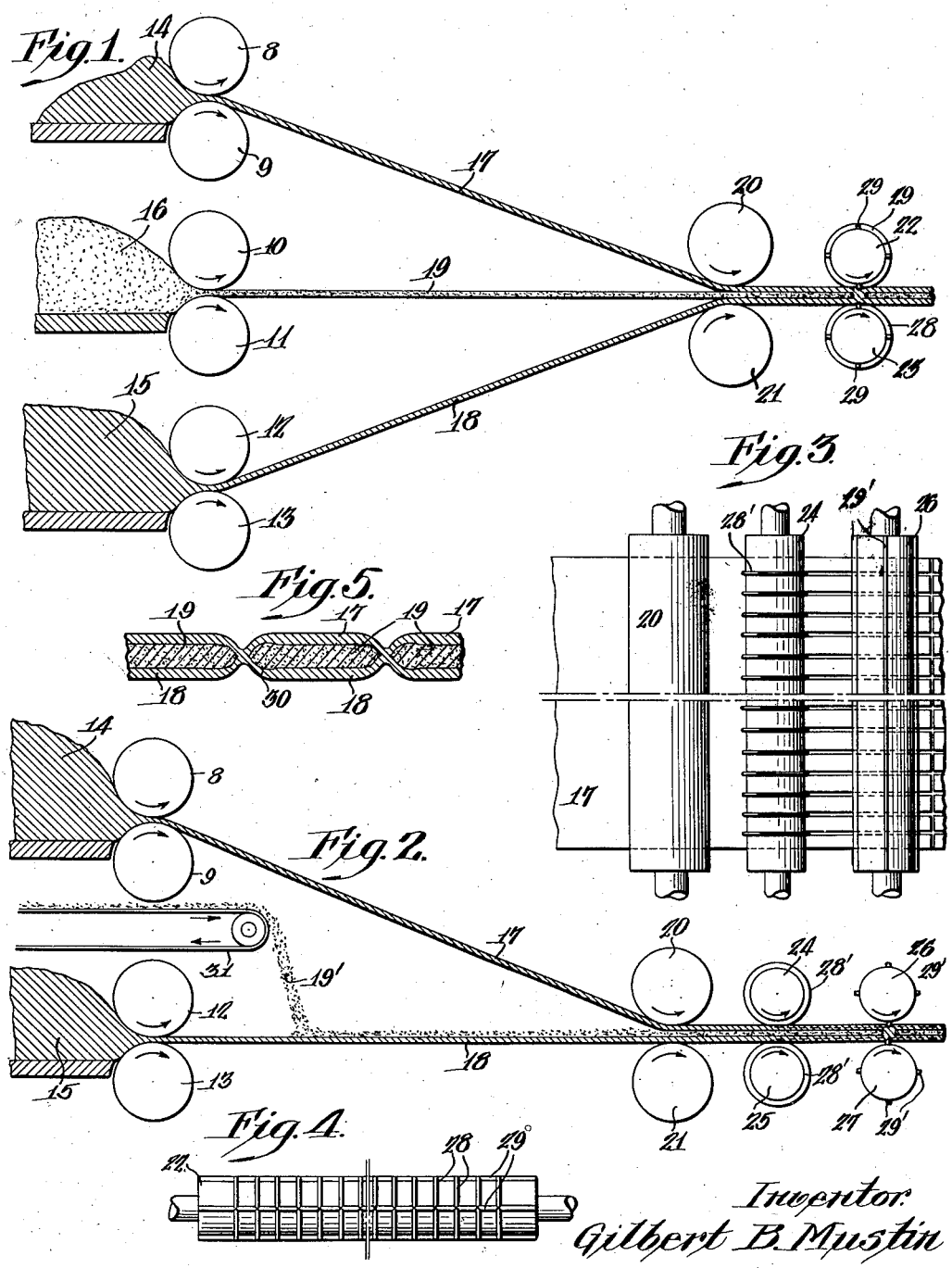
Inventor
Gilbert B. Mustin
by
Attorney
Witness:
Walter Chism Patented July 29, 1930

1,771,506

UNITED STATES PATENT OFFICE

GILBERT B. MUSTIN, OF LANSDOWNE, PENNSYLVANIA

METHOD OF MAKING CHEWING-GUM SANDWICHES

Application filed November 10, 1926. Serial No. 147,434.

My invention relates to chewing gum products.

The purpose of my invention is to form a sandwich having top and bottom layers of chewing gum and an intermediate layer of confection, fruit, medicine or other desired material.

A further purpose is to enhance the flavor of chewing gum.

A further purpose is to seal a central layer between strips of chewing gum so as to form a sandwich by forcing the upper and lower chewing gum layers into contact through it.

A further purpose is to provide a novel method of making a chewing gum sandwich.

Further purposes will appear in the specification and in the claim.

I have preferred to illustrate my invention by one main form only, slightly modified to suit the character of filling, and with several illustrations of product; selecting a form which is simple, practical and effective and which at the same time well illustrates the principles of my invention.

Figures 1 and 2 are diagrammatic illustrations of the rolls and paths of material rolled, suiting to different inserts, to show the method of manufacture.

Figure 3 is a top plan view true of both Figures 1 and 2.

Figure 4 is a top plan view of a roll taking the place of two rolls in Figure 3.

Figure 5 is a fragmentary enlarged section of a sheet of the sandwich material after it has been scored.

In the drawings similar numerals indicate like parts.

I have discovered that sandwiches can be made of chewing gum and a content of filling which may be a flavored sugary mass of dough-like consistency or a loose filling and which may be made up from a great variety of materials. I have found that the sandwich need not depend upon the adhesion of the content to the strips of chewing gum to hold it together—though it may use this adhesion in whole or in part—but that the entire sandwich can be held together and the filling or other content can be kept from drying out by forcing the lower surface of the upper layer and the upper surface of the lower layer into contact through the sandwich filling so far as to hold them by cohesion of the chewing gum and to enclose the filling and seal it about the edges. The filling may be thick or thin.

As the mechanism for forming the sandwich may be varied considerably I have preferred to illustrate diagrammatically only.

The three sets of rolls 8—9, 10—11 and 12—13 are suitably driven and are fed by masses 14, 15 of gum and 16 of filling material. They are so placed that the rolls 8—9 and 12—13 deliver strips 17 and 18 of gum upon opposite sides (Figure 1) of a strip 19 of lozenge or other sandwich filling which may include a single flavor or character only, such as a confection of any kind, a fruit, a medicine or other filling or may include a combination of any two or more of these. Where a medicament or other filling is to be carried which will not hold together from its own cohesion or which is too small in quantity for the purpose I prefer to use a body having sufficient cohesion to roll and free from objectionable ingredients as a carrier for the desired content.

Ordinarily a sugary filling may be made the base for any content which is to be included. This affords a very desirable means of enhancing the flavor of the chewing gum. There are very definite limits as to the amount of flavor which can be put in ordinary chewing gum because many flavors if used too liberally tend to break down the "fabric" of the gum. Introduction of a layer of sugar which could be very highly flavored affords one of the best ways to increase the flavor.

The strips of material are united by pressure to form a sandwich using the cohesion and adhesion of the filling layer, where this is suitable, or uniting by a gum-to-gum union of the outer layers as preferred. I show one mechanism for the purpose and illustrate the more difficult of these, to carry out, the gum-to-gum union. The choice will depend upon the character of content and the preference of the maker. For the union I show suitably driven rolls 20 and 21 which preferably merely unite the layers.

There is an advantage in scoring both longitudinally of the strip and transversely of it, as by rolls 22 and 23 in Figure 1, (seen in plan view in Figure 4), in that it avoids the risk, present somewhat in separate scoring, that the second scoring operation will loosen at the edges the gum-to-gum attachment produced by the first. On the other hand there is some advantage in separately scoring lengthwise and across the sheet by pairs of rolls 24—25, 26—27, as in Figures 2 and 3, in that there is less tendency of the gum to "pocket" within the space bounded by the scoring knives.

Where the scoring is in separate operations there is some advantage in doing the longitudinal scoring first and the transverse scoring subsequently. It would be possible, of course, to use but one pair of rolls for the rolling and scoring operations performed by the two pairs of rolls in Figure 1, omitting rolls 20 and 21, or to use the first scoring pair of rolls for the rolling operation also, omitting rolls 20 and 21 in Figure 2 and requiring but two pairs of rolls instead of the three pairs of rolls shown there.

The scoring knives are desirably blunt and are shown at 28 and 29 in Figures 1 and 4 and 28', and 29' in Figures 2 and 3.

As usual in the handling of rolled chewing gum the score will preferably not cut completely through the strip but will leave enough of a web where scored to hold the sheet of material together, leaving the web for subsequent breakage. This makes the product much easier to handle and avoids danger of the pieces scored sticking to the rolls.

The filling material will normally be much softer than the gum and not so tough as it is.

I find that with relatively blunt scoring, two strips of gum may be so far forced together as to squeeze out the softer intermediate filling before the gum is seriously cut. The two strips of gum unite with further pressure. As a result a gum-to-gum joint is formed by the scoring, uniting the two strips of gum as shown at 30 in Figure 5 and giving the cohesion of a continuous thickness of gum at this point so as to effectively seal the edges about the confection or other product, preventing evaporization of the content and avoiding such injury to the content as would result from air contact.

In the form shown in Figure 2 the gummed strips are the same and in the same relation as in Figure 1. The filling material 19' is in divided form and is distributed upon the lower gummed strip by carrying it upon a conveyor 31 from which it may be spread directly or by intervening distributor as preferred.

The loose layer 19' of the filling is incorporated between the strips 17 and 18 with the same capability of variation of the process as in the other form.

The sandwiches may be scored to any shape which will cut the sheet to advantage, fitting any irregularities of outline of one sandwich by the corresponding or complementary shape of the adjoining sandwich or sandwiches. They are shown as rectangular, the simplest shape being square.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desire to secure by Letters Patent is:—

The method of making chewing gum sandwiches which consists in converging sheets of chewing gum upon an intermediate filler layer having substantially the width of the sheets of gum and in simultaneously rolling and externally scoring the composite sheet to subdivide it into separate sandwiches.

GILBERT B. MUSTIN.